United States Patent [19]

Fujikawa et al.

[11] Patent Number: 5,305,409
[45] Date of Patent: Apr. 19, 1994

[54] TIME-REDUCING OPTICAL FIBER CONNECTOR

[75] Inventors: Jyunji Fujikawa; Tadashi Seto, both of Shiga, Japan

[73] Assignee: Nippon Electric Glass Co., Ltd., Otsu, Japan

[21] Appl. No.: 966,926

[22] Filed: Oct. 27, 1992

[30] Foreign Application Priority Data

Oct. 28, 1991 [JP] Japan .................. 3-280996

[51] Int. Cl.$^5$ .............................. G02B 6/38
[52] U.S. Cl. ........................ 385/95; 385/51; 385/68
[58] Field of Search ............. 385/95, 96, 97, 98, 385/99, 51, 63, 66, 68, 84, 70, 71

[56] References Cited

U.S. PATENT DOCUMENTS

| 4,662,713 | 5/1987 | Davies et al. | 385/71 X |
|---|---|---|---|
| 4,733,930 | 3/1988 | Severin et al. | 385/51 X |
| 4,812,008 | 3/1989 | Tokumaru et al. | 385/70 |
| 5,016,972 | 5/1991 | Schlaak | 385/95 |
| 5,082,346 | 1/1992 | Myers | 385/51 |
| 5,098,459 | 3/1992 | Fukuma | 385/51 |

Primary Examiner—John D. Lee
Assistant Examiner—Phan T. Heartney
Attorney, Agent, or Firm—Nikaido, Marmelstein, Murray & Oram

[57] ABSTRACT

A permanent optical fiber connector which makes it possible to connect and fix optical fibers (A) in some seconds. This connector comprises a base part (B) including a base body (4) made of a material of low expansion coefficient having a pair of opposed locking elements (7) and one or more capillary tubes (5) bonded to the base body and having an inner diameter slightly greater than the cladding of an optical fiber, and an optical fiber pressing part (C) including a pressing body (21) made of a material of low expansion coefficient and adapted to fit between the locking elements (7) of the base body to be embraced thereby and elastic bodies (22) attached to the lower surface of the pressing body, said pressing body (21) being embraced between the locking elements (7) of the base body, whereby the optical fiber pressing part (C) presses the covers (3) and optical fiber bodies (2) of the optical fibers (A) against the base part (B) to fix them to the latter.

3 Claims, 4 Drawing Sheets

TIME-REDUCING OPTICAL FIBER CONNECTOR

BACKGROUND OF THE INVENTION

1. Field of the Invention

The present invention relates to a permanent optical fiber connector.

2. Prior Art

In conventional optical fibers, the alignment of the abutting ends of optical fibers is effected by a V-groove, 3-point support or precision capillary tube; after the optical fibers have been temporarily fixed, they are fixed by using a ultraviolet-curable adhesive agent.

In the case of using an ultraviolet-curable agent for fixing optical fibers, it takes tens of seconds or some minutes for the adhesive agent to cure. Therefore, if an emergent operation is to be performed in case of an optical fiber breakage or other damage to optical fiber communications networks, it is desired to shorten the operating time required.

With the above drawback of the conventional permanent optical fiber connector in mind, the present invention has been accomplished as a result of intensive studies.

SUMMARY OF THE INVENTION

The invention as claimed in claim 1 is characterized in that it comprises a base part including a base body made of a material of low expansion coefficient having a plate-like base and a pair of opposed locking elements erected thereon and one or more capillary tubes bonded to the plate-like base of the base body and having an inner diameter slightly greater than the cladding of the optical fiber, and an optical fiber pressing part including a pressing body made of a material of low expansion coefficient and adapted to be embraced as it fits between the locking elements of the base body and elastic bodies attached to the lower surface of the pressing body, said pressing body being embraced between the locking elements of the base body, whereby the optical fiber pressing part presses the optical fiber covers and optical fiber bodies against the base part.

The invention as claimed in claim 2 is as set forth in claim 1 and characterized in that the opposite sides of the upper surface of the capillary tube are formed with fitting grooves and the elastic bodies attached to the lower surface of the pressing body fit in the fitting grooves to press the optical fiber bodies inserted in the capillary tube against the inner wall of the capillary tube.

The invention as claimed in claim 3 is as set forth in claim 1 or 2 and characterized in that the opposite ends of the capillary tube are formed with optical fiber insertion taper portions and the middle upper surface thereof is formed with a bubble discharging groove filled with a refractive index matching agent matching with the optical fiber core in refractive index.

According to the permanent optical fiber connector of the present invention, optical fibers can be fixed to the base part by simply fitting the optical fiber pressing part in the base part, the operating time required being shorter than when using an ultraviolet-curable adhesive agent.

Further, the base body of the base part and the pressing body of the optical fiber pressing part are made of a material of low expansion coefficient and the claddings of optical fibers to abut at their ends against each other are pressed, at their portions, against and fixed to the inner wall of the capillary tube by the elastic bodies. And a precision glass capillary tube is used for the alignment of the optical fiber abutting ends while a refractive index matching agent is used for connection, thereby making it possible to decrease influences on connection loss of optical signals due to temperature changes.

DESCRIPTION OF PREFERRED EMBODIMENTS

Figure 1:
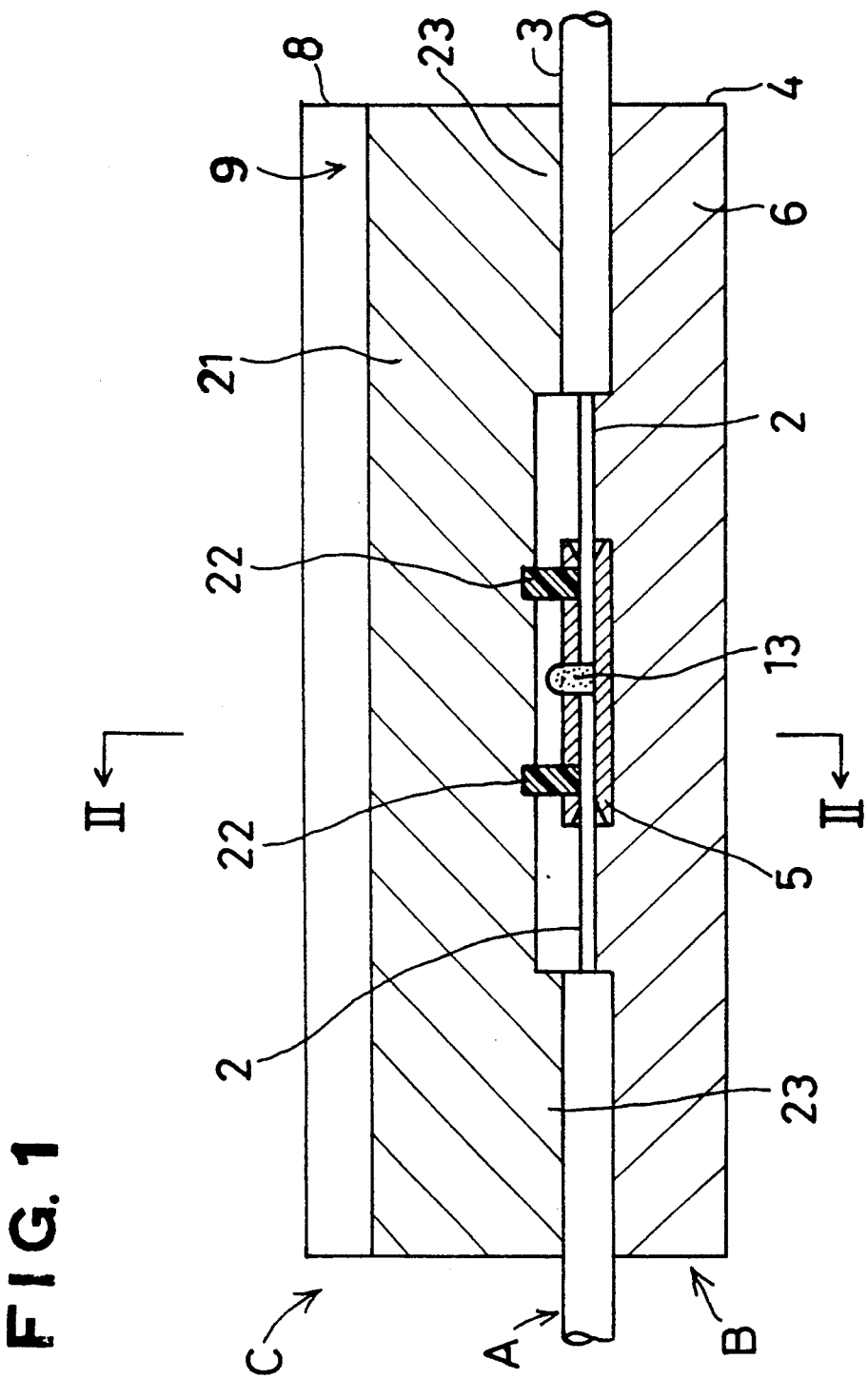
FIG. 1 is a longitudinal section, showing an embodiment of a permanent optical fiber connector according to the present invention.

In the drawings, A denotes an optical fiber; B denotes a base part; C denotes an optical fiber pressing part (hereinafter referred to as pressing part).

Figure 2:
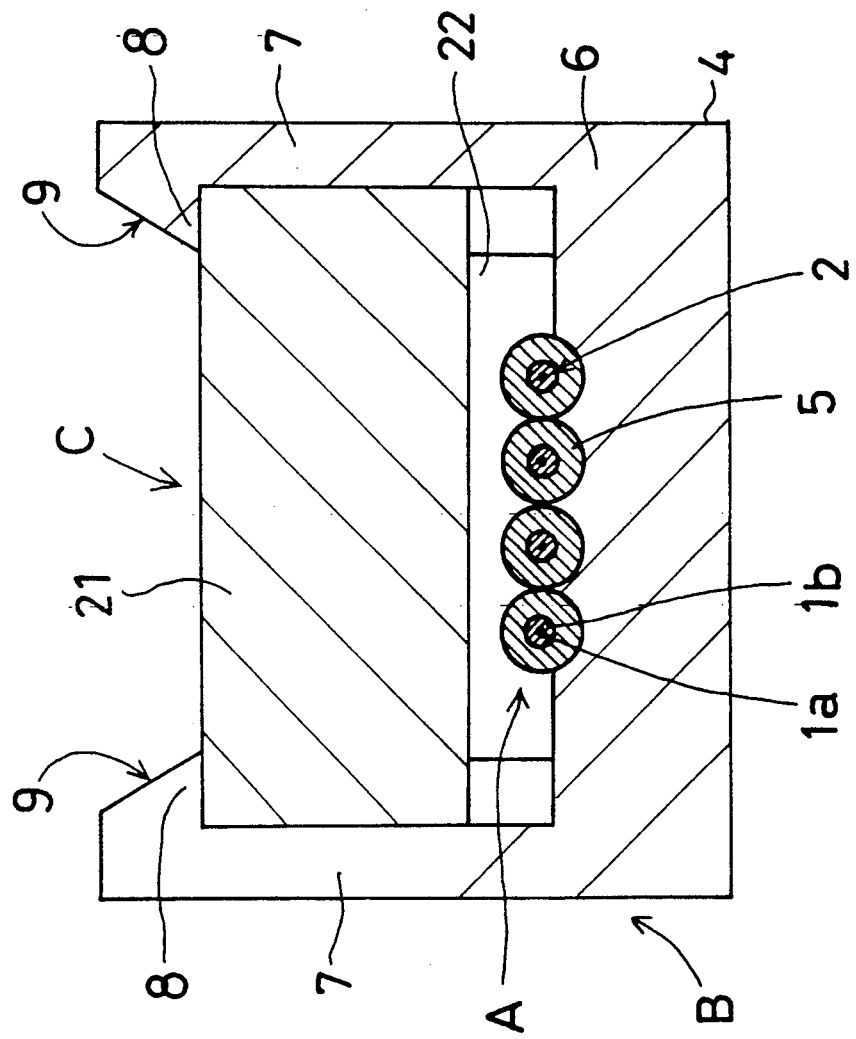
FIG. 2 is a sectional view taken along the line II—II in FIG. 1.
Figure 3:
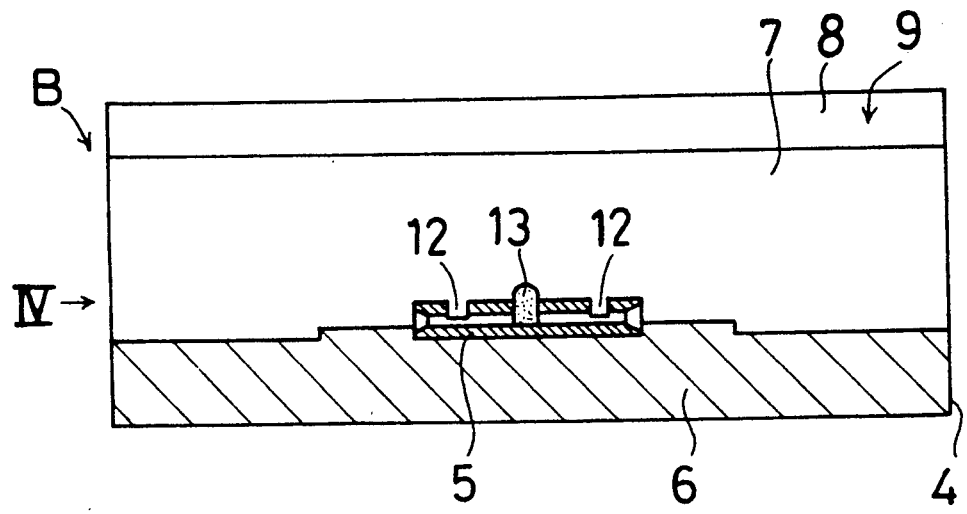
FIG. 3 is a longitudinal section of a base part.
Figure 4:
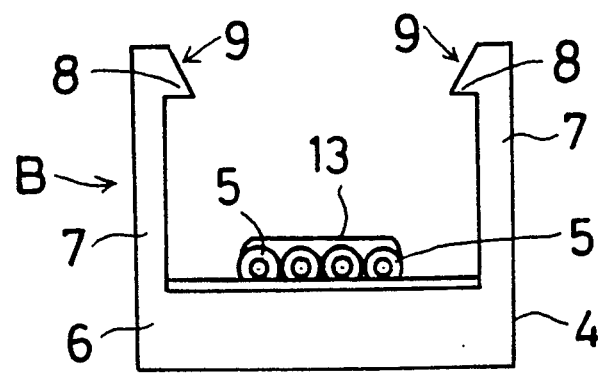
FIG. 4 is a view taken in the direction of arrow IV in FIG. 3.
Figure 5:
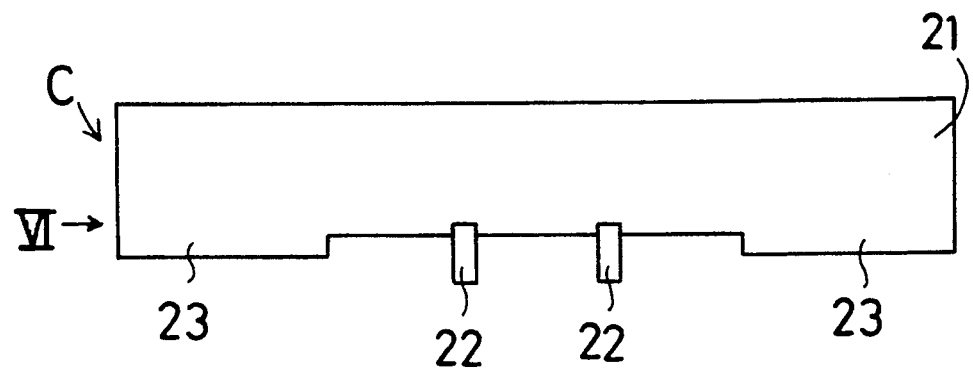
FIG. 5 is a side view of an optical fiber pressing part.
Figure 6:
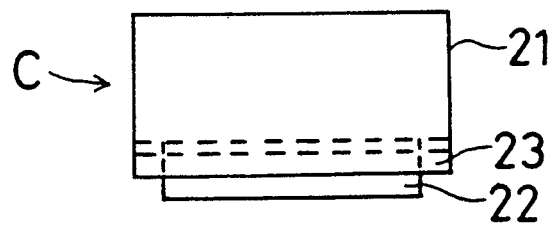
FIG. 6 is a view taken in the direction of arrow IV in FIG. 5.

The optical fiber A, as shown in FIGS. 1 and 2, comprises an optical fiber body 2 including a glass core 1a of about 10 $\mu$m or 50 $\mu$m in diameter, for example, and a glass cladding 1b of about 125 $\mu$m in outer diameter concentrically surrounding said core, and a high polymer cover 3 of about 250 $\mu$m or about 900 $\mu$m in diameter covering said optical fiber body, the refractive index of the core 1a being set somewhat higher than that of the cladding 1b so as to construct a total reflection type optical wave guide passage preventing light from leaking from the core 1a. Depending upon uses or transmission capacity required, this optical fiber A may be used either in the form of a single-core type optical fiber consisting of a single optical fiber or in the form of a multi-core type optical fiber made by bundling a plurality of optical fibers into ribbon form.

The base part B, as shown in FIGS. 1 through 4, comprises a base body 4 of engineering plastic of low expansion coefficient, and a capillary tube 5 of precision glass having an inner diameter slightly larger than the cladding 1b of the optical fiber. In the case of a single-core type, one such capillary tube 5 is bonded to the middle upper region of the base body 4 but in the case of a multi-core type, a plurality of such capillary tubes 5 are likewise bonded thereto.

The base body 4 of said base part B, as can be seen in FIG. 2, is U-shaped in cross-section, having a pair of opposed locking elements 7 at the widthwise opposite lateral edges of a plate-like base 6, each locking element 7 being formed at its upper end edge with an inwardly projecting pawl 8, the latter being formed with an inwardly inclined guide surface 9. When the pressing part C is abutted against the guide surfaces 9 and thrusted from above, the locking elements 7 are elastically spread outward to allow the pressing part C to fit between the locking elements 7. When the pressing part C abuts against the plate-like base 6, the locking elements 7 are restored by the elastic restoring force, and the pawls 8 engage the upper surface of the pressing part C to thereby firmly embrace the pressing part C.

Figure 7:
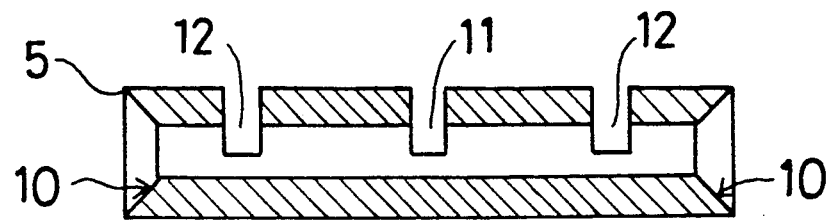
FIG. 7 is an enlarged longitudinal section of a capillary tube.

The capillary tube 5, as shown in FIG. 7, has taper portions 10 for receiving the optical fiber bodies 2 including the cores 1a and claddings 1b of the optical fibers A and is formed at its middle upper surface with a bubble discharging groove 11 and at the lengthwise symmetrical regions of its upper surface and between the grooves 11 with fitting grooves 12 which open inward.

The capillary tube 5 has single-core type or ribbon-like multi-core type optical fibers inserted therein from the opposite ends and connected together at the bubble discharging groove 11 filled in advance with a refractive index matching agent 13 (FIG. 1). The refractive index matching agent is a gel.

The single-core type or ribbon-like multi-core type optical fibers connected together in the capillary tube 5 of the base part B are pressed against the plate-like base 6 of the base body 4 by the optical fiber pressing part C (FIGS. 1 and 2).

The optical fiber pressing part C, as shown in FIGS. 1, 2, 5 and 6, comprises a substantially rectangular parallelepiped pressing body 21 fitted in the base part B from above, and strip-like elastic bodies 22. The pressing body 21, which is made of engineering plastic of low expansion coefficient, has the longitudinally opposite ends of the lower surface raised to define raised portions 23. The pressing body 21 presses against the base part B by said raised portion 23 the covers 3 of the optical fibers A connected together through the refractive index matching agent 13 in the capillary tube 5.

The elastic bodies 22 are made of high polymer or other elastic material, preferably silicone rubber or the like superior in weather resistance and heat resistance. The elastic bodies 22 are attached at longitudinal positions in the middle region of the lower surface of the pressing body 21 corresponding to the fitting grooves 12 of the capillary tube 5, so that when the pressing body 21 is fitted between the locking elements 7, they fit in the fitting grooves 12, thereby pressing the claddings 1b of the optical fibers A inserted in the capillary tube 5 against the inner wall of the capillary tube 5 (FIG. 1).

The base part B and the pressing part C may be provided with positioning means for preventing deviation in the direction of the optical axis. For example, either the inner surfaces of the locking elements 7 of the base part B or the opposed outer surfaces of the pressing body 21 opposed to said inner surfaces may be formed with guide grooves extending in the fitting direction of the pressing part C and the others may be formed with ridges which can be fitted in said guide grooves, so that when the pressing part C is fitted in the base part B from above, the ridges are fitted in the guide grooves so as to prevent deviation of the pressing part C in the direction of the optical axis.

The method of using the permanent optical fiber connector according to the present invention will now be described.

First, the base part B and the optical fiber pressing part C may be packaged integrally or separately. At the job site, the package is undone and the ends of optical fibers A to be connected are inserted into the capillary tube 5 of the base part B from opposite sides. In this case, the ends of the optical fibers A have their covers stripped over a required length to expose the claddings 1b. Further, the refractive index matching agent is put in advance in the capillary tube 5. Therefore, if the ends of the optical fibers are inserted in the capillary tube 5, the refractive index matching agent 13 is moved to the middle bubble discharging groove 11, where the abutting ends of the optical fibers are connected together with the refractive index matching agent interposed therebetween. Even if air bubbles migrate into the refractive index matching agent when the ends of the optical fibers A are inserted in the capillary tube 5, the abutment of the ends of the optical fibers A against each other causes the air bubbles to be driven out from between the abutting ends and discharged through the bubble discharging groove 11.

Subsequently, the pressing part C is fitted in the base part B. At this time, the widthwise opposite edges of the lower surface of the pressing body 21 abut against the guide surfaces 9 of the locking elements 7 of the base part B to spread the locking elements 7 outward to enable downward movement of the pressing part C. And as soon as the upper edge of the pressing part C passes by the pawls 8, the locking elements 7 are elastically restored inward to cause the pawls 8 to engage the opposed widthwise lateral edges of the upper surface of the pressing body 21 so as to embrace the pressing part C. With the pressing part C thus embraced, the raised portions 23 of the pressing body 21 press the covers 3 of the optical fibers A against the upper surface of the plate-like base 6 of the base part B, while the elastic bodies 22 fit in the fitting grooves 12 of the capillary tube 5 to press the claddings 1b of the optical fibers A inserted in the capillary tube 5 against the inner wall of the capillary tube 5. This pressing force is provided by the restoring force of the locking elements 7, the pressing force of the pressing body 21 and the elastic restoring force of the elastic bodies 22, ensuring sufficiently strong fixing. Particularly, since the pressing force can be applied not only to the optical fiber bodies 2 to be connected together but also to the covers 3, the strength to resist the tensile force acting on the optical fibers is increased, providing sufficient reliability.

In addition, when the permanent optical fiber connector according to the present invention was used, the fixing of a single-core type or ribbon-like multi-core type optical fibers was attained in some seconds. The change in connection loss in a cycle test in a temperature range of 40° C. to 80° C. was not more than 0.2 dB.

As has been described so far, according to the present invention, optical fibers can be fixed in position by simply fitting the optical fiber pressing part in the base part from above. The time taken to fix optical fibers in position, which has heretofore been tens of seconds to some minutes, can be decreased to some seconds. Thus, the present invention is superior in the case where an emergency measure has to be taken in optical fiber communications networks. Of course, it can be used in other cases as well.

Further, the base part and the optical fiber pressing part are made of a material of low expansion coefficient. Portions of the claddings of optical fibers are pressed by the elastic bodies. A refractive index matching agent is interposed between the abutting ends of optical fibers to be connected together. These features serve to prevent the optical fibers from deviating in the direction of the optical axis, minimizing connection loss of optical signals due to temperature changes.

Further, since the optical fiber pressing part effects pressing over a large area including not only the optical fiber bodies but also the covers, the tensile strength limit can be increased. Since the opposite ends of the capillary tube are formed with taper portions for insertion of optical fiber bodies, the insertion of optical fiber bodies is facilitated.

What is claimed is:

1. A permanent optical fiber connector comprising a base part including a base body made of a material of low expansion coefficient having a pair of opposed locking elements and one or more capillary tubes bonded to the base body and having an inner wall diameter slightly greater than a cladding of an optical fiber, and an optical fiber pressing part including a pressing body made of a material of low expansion coefficient and adapted to be embraced as it fits between the locking elements of the base body and elastic bodies attached to a lower surface of the pressing body, said pressing body being embraced between the locking elements of the base body, whereby optical fiber covers and optical fiber bodies are pressed against the base part by the optical fiber pressing part.

2. A permanent optical fiber connector as set forth in claim 1, wherein opposite sides of the upper surface of the capillary tube are formed with fitting grooves and the elastic bodies attached to the lower surface of the pressing body fit in the fitting grooves to press the optical fiber bodies inserted in the capillary tube against the inner wall of the capillary tube.

3. A permanent optical fiber connector as set forth in claim 1 or 2, wherein the opposite ends of the capillary tube are formed with optical fiber insertion taper portions and a middle upper surface thereof is formed with a bubble discharging groove filled with a refractive index matching agent matching with the optical fiber core in refractive index.

* * * * *